United States Patent
Sironi et al.

(10) Patent No.: US 11,038,307 B2
(45) Date of Patent: Jun. 15, 2021

(54) CABLE POWER RATING IDENTIFICATION FOR POWER DISTRIBUTION OVER COMMUNICATIONS CABLING

(71) Applicant: CISCO TECHNOLOGY, INC., San Jose, CA (US)

(72) Inventors: Paolo Sironi, Gallarate (IT); Simone Vigna, Milan (IT); Joel Richard Goergen, Soulsbyville, CA (US); Chad M. Jones, Doylestown, OH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 311 days.

(21) Appl. No.: 16/121,103

(22) Filed: Sep. 4, 2018

(65) Prior Publication Data
US 2019/0363493 A1    Nov. 28, 2019

Related U.S. Application Data

(60) Provisional application No. 62/676,695, filed on May 25, 2018.

(51) Int. Cl.
*H01R 13/641* (2006.01)
*H01R 13/66* (2006.01)
(Continued)

(52) U.S. Cl.
CPC ......... *H01R 13/641* (2013.01); *H01R 13/631* (2013.01); *H01R 13/6616* (2013.01); *H01R 13/7175* (2013.01); *H01R 24/64* (2013.01); *H02H 1/0007* (2013.01); *H02H 3/42* (2013.01); *H02H 9/00* (2013.01); *H01R 2107/00* (2013.01); *H01R 2201/04* (2013.01)

(58) Field of Classification Search
CPC ................ H01R 13/641; H01R 13/631; H01R 13/6616; H02H 1/0007
See application file for complete search history.

(56) References Cited

U.S. PATENT DOCUMENTS

| 3,335,324 A | 8/1967 | Buckeridge |
| 4,811,187 A | 3/1989 | Nakajima |
(Continued)

FOREIGN PATENT DOCUMENTS

| CN | 1209880 C | 7/2005 |
| CN | 201689347 U | 12/2010 |
(Continued)

OTHER PUBLICATIONS https://www.fischerconnectors.com/us/en/products/fiberoptic.
(Continued)

*Primary Examiner* — Scott Bauer
(74) *Attorney, Agent, or Firm* — Cindy Kaplan

(57) ABSTRACT

In one embodiment, as apparatus includes a cable identifier for attachment to a plug and cable assembly operable to deliver Power over Ethernet (PoE) at a power greater than 90 watts, the plug and cable assembly receivable in a receptacle delivering the PoE. The cable identifier is configured for mating with the receptacle and includes an electrical identifier for use in identifying a power rating of the cable when the plug and cable assembly is inserted into the receptacle. A method and network device are also disclosed herein.

20 Claims, 11 Drawing Sheets

(51) Int. Cl.
*H01R 13/631* (2006.01)
*H01R 13/717* (2006.01)
*H02H 1/00* (2006.01)
*H02H 3/42* (2006.01)
*H02H 9/00* (2006.01)
*H01R 24/64* (2011.01)
*H01R 107/00* (2006.01)

(56) References Cited

U.S. PATENT DOCUMENTS

| | | |
|---|---|---|
| 6,220,955 B1 | 4/2001 | Posa |
| 6,259,745 B1 | 7/2001 | Chan |
| 6,685,364 B1 | 2/2004 | Brezina |
| 6,826,368 B1 | 11/2004 | Koren |
| 6,855,881 B2 | 2/2005 | Khoshnood |
| 7,325,150 B2 | 1/2008 | Lehr et al. |
| 7,420,355 B2 | 9/2008 | Liu |
| 7,583,703 B2 | 9/2009 | Bowser |
| 7,589,435 B2 | 9/2009 | Metsker |
| 7,593,747 B1 | 9/2009 | Karam |
| 7,616,465 B1 | 11/2009 | Vinciarelli |
| 7,813,646 B2 | 10/2010 | Furey |
| 7,835,389 B2 | 11/2010 | Yu |
| 7,915,761 B1 | 3/2011 | Jones |
| 7,921,307 B2 | 4/2011 | Karam |
| 7,924,579 B2 | 4/2011 | Arduini |
| 7,940,787 B2 | 5/2011 | Karam |
| 7,973,538 B2 | 7/2011 | Karam |
| 8,020,043 B2 | 9/2011 | Karam |
| 8,037,324 B2 | 10/2011 | Hussain |
| 8,184,525 B2 | 5/2012 | Karam |
| 8,276,397 B1 | 10/2012 | Carlson |
| 8,310,089 B2 | 11/2012 | Schindler |
| 8,345,439 B1 | 1/2013 | Goergen |
| 8,350,538 B2 | 1/2013 | Cuk |
| 8,358,893 B1 | 1/2013 | Sanderson |
| 8,700,923 B2 | 4/2014 | Fung |
| 8,781,637 B2 | 7/2014 | Eaves |
| 8,829,917 B1 | 9/2014 | Lo |
| 8,836,228 B2 | 9/2014 | Xu |
| 8,842,430 B2 | 9/2014 | Hellriegel |
| 9,024,473 B2 | 5/2015 | Huff et al. |
| 9,184,795 B2 | 11/2015 | Eaves |
| 9,189,043 B2 | 11/2015 | Vorenkamp |
| 9,273,906 B2 | 3/2016 | Goth |
| 9,319,101 B2 | 4/2016 | Lontka |
| 9,373,963 B2 | 6/2016 | Kuznelsov |
| 9,419,436 B2 | 8/2016 | Eaves |
| 9,510,479 B2 | 11/2016 | Vos |
| 9,531,551 B2 | 12/2016 | Balasubramanian |
| 9,590,811 B2 | 3/2017 | Hunter |
| 9,640,998 B2 | 5/2017 | Dawson |
| 9,665,148 B2 | 5/2017 | Hamdi |
| 9,693,244 B2 | 6/2017 | Maruhashi |
| 9,734,940 B1 | 8/2017 | McNutt |
| 9,853,689 B2 | 12/2017 | Eaves |
| 9,874,930 B2 | 1/2018 | Vavilala et al. |
| 9,882,656 B2 | 1/2018 | Sipes, Jr. |
| 9,893,521 B2 | 2/2018 | Lowe |
| 9,948,198 B2 | 4/2018 | Imai |
| 10,007,628 B2 | 6/2018 | Pitigoi-Aron |
| 10,028,417 B2 | 7/2018 | Schmidtke |
| 10,407,995 B2 | 9/2019 | Moeny |
| 2002/0126967 A1 | 9/2002 | Panak |
| 2004/0000816 A1 | 1/2004 | Khoshnood |
| 2004/0033076 A1 | 2/2004 | Song |
| 2004/0043651 A1 | 3/2004 | Bain |
| 2004/0073703 A1 | 4/2004 | Boucher |
| 2005/0197018 A1 | 9/2005 | Lord |
| 2005/0268120 A1 | 12/2005 | Schindler |
| 2006/0202109 A1 | 9/2006 | Delcher |
| 2007/0103168 A1 | 5/2007 | Batten |
| 2007/0288125 A1 | 12/2007 | Quaratiello |
| 2008/0198635 A1 | 8/2008 | Hussain |
| 2008/0229120 A1 | 9/2008 | Diab |
| 2008/0310067 A1 | 12/2008 | Diab |
| 2010/0077239 A1 | 3/2010 | Diab |
| 2010/0117808 A1 | 5/2010 | Karam |
| 2010/0171602 A1 | 7/2010 | Kabbara |
| 2010/0190384 A1 | 7/2010 | Lanni |
| 2010/0290190 A1 | 11/2010 | Chester |
| 2011/0290497 A1 | 1/2011 | Stenevik |
| 2011/0083824 A1 | 4/2011 | Rogers |
| 2011/0266867 A1 | 11/2011 | Schindler |
| 2012/0064745 A1 | 3/2012 | Ottliczky |
| 2012/0170927 A1 | 7/2012 | Huang |
| 2012/0201089 A1 | 8/2012 | Barth |
| 2012/0231654 A1 | 9/2012 | Conrad |
| 2012/0317426 A1 | 12/2012 | Hunter, Jr. |
| 2012/0319468 A1 | 12/2012 | Schneider |
| 2013/0077923 A1 | 3/2013 | Weem |
| 2013/0079633 A1 | 3/2013 | Weem |
| 2013/0103220 A1 | 4/2013 | Eaves |
| 2013/0249292 A1 | 9/2013 | Blackwell, Jr. |
| 2013/0272721 A1 | 10/2013 | Van Veen |
| 2014/0258742 A1 | 9/2014 | Chien |
| 2015/0078740 A1 | 3/2015 | Sipes, Jr. |
| 2015/0106539 A1 | 4/2015 | Leinonen |
| 2015/0115741 A1 | 4/2015 | Dawson |
| 2015/0153766 A1* | 6/2015 | Afrooze ............... G06F 3/0644 711/115 |
| 2015/0215001 A1 | 7/2015 | Eaves |
| 2015/0333918 A1 | 11/2015 | White, III |
| 2015/0346792 A1* | 12/2015 | Rathi ................... G05F 1/625 713/310 |
| 2016/0020911 A1 | 1/2016 | Sipes, Jr. |
| 2016/0049810 A1* | 2/2016 | Armstrong, II ....... H02J 7/0014 320/118 |
| 2016/0064938 A1 | 3/2016 | Balasubramanian |
| 2016/0111877 A1 | 4/2016 | Eaves |
| 2016/0134331 A1 | 5/2016 | Eaves |
| 2016/0142217 A1 | 5/2016 | Gardner |
| 2016/0197600 A1 | 7/2016 | Kuznetsov |
| 2016/0365967 A1 | 7/2016 | Tu |
| 2016/0241148 A1 | 8/2016 | Kizilyalli |
| 2016/0262288 A1 | 9/2016 | Chainer |
| 2016/0294500 A1 | 10/2016 | Chawgo |
| 2016/0308683 A1 | 10/2016 | Pischl |
| 2016/0352535 A1 | 12/2016 | Hiscock |
| 2017/0054296 A1 | 2/2017 | Daniel |
| 2017/0110871 A1 | 4/2017 | Foster |
| 2017/0146260 A1 | 5/2017 | Ribbich |
| 2017/0155517 A1 | 6/2017 | Cao |
| 2017/0164525 A1 | 6/2017 | Chapel |
| 2017/0155518 A1 | 7/2017 | Yang |
| 2017/0214236 A1 | 7/2017 | Eaves |
| 2017/0229886 A1 | 8/2017 | Eaves |
| 2017/0234738 A1 | 8/2017 | Ross |
| 2017/0248976 A1 | 8/2017 | Moller |
| 2017/0325320 A1 | 11/2017 | Wendt |
| 2017/0354053 A1* | 12/2017 | Irons ................... H01R 25/165 |
| 2018/0024964 A1 | 1/2018 | Mao |
| 2018/0060269 A1 | 3/2018 | Kessler |
| 2018/0088648 A1 | 3/2018 | Otani |
| 2018/0098201 A1 | 4/2018 | Torello |
| 2018/0102604 A1 | 4/2018 | Keith |
| 2018/0123360 A1 | 5/2018 | Eaves |
| 2018/0188712 A1 | 7/2018 | MacKay |
| 2018/0191513 A1 | 7/2018 | Hess |
| 2018/0254624 A1 | 9/2018 | Son |
| 2018/0313886 A1 | 11/2018 | Mlyniec |
| 2019/0190727 A1* | 6/2019 | LaBosco ............... H04L 12/10 |

FOREIGN PATENT DOCUMENTS

| | | |
|---|---|---|
| CN | 204836199 U | 12/2015 |
| CN | 205544597 | 8/2016 |
| CN | 104081237 B | 10/2016 |
| CN | 104412541 B | 5/2019 |
| EP | 1936861 A1 | 6/2008 |
| EP | 2120443 A1 | 11/2009 |
| EP | 2693688 A1 | 2/2014 |
| WO | WO199316407 A1 | 8/1993 |
| WO | WO2010053542 | 5/2010 |

(56) References Cited

FOREIGN PATENT DOCUMENTS

| WO | WO2017054030    | 4/2017  |
|----|-----------------|---------|
| WO | WO2017167926 A1 | 10/2017 |
| WO | WO2018017544 A1 | 1/2018  |
| WO | WO2019023731 A1 | 2/2019  |

OTHER PUBLICATIONS http://www.strantech.com/products/tfoca-genx-hybrid-2×2-fiber-optic-copper-connector/.
http://www.qpcfiber.com/product/connectors/e-link-hybrid-connector/.
https://www.lumentum.com/sites/default/files/technical-library-items/poweroverfiber-tn-pv-ae_0.pdf.
"Network Remote Power Using Packet Energy Transfer", Eaves et al., www.voltserver.com, Sep. 2012.
Product Overview, "Pluribus VirtualWire Solution", Pluribus Networks, PN-PO-VWS-05818, https://www.pluribusnetworks.com/assets/Pluribus-VirtualWire-PO-50918.pdf, May 2018, 5 pages.
Implementation Guide, "Virtual Chassis Technology Best Practices", Juniper Networks, 8010018-009-EN, Jan. 2016, https://wwwjuniper.net/us/en/local/pdf/implementation-guides/8010018-en.pdf, 29 pages.
Yencheck, Thermal Modeling of Portable Power Cables, 1993.
Zhang, Machine Learning-Based Temperature Prediction for Runtime Thermal Management across System Components, Mar. 2016.
Data Center Power Equipment Thermal Guidelines and Best Practices.
Dynamic Thermal Rating of Substation Terminal Equipment by Rambabu Adapa, 2004.
Chen, Real-Time Termperature Estimation for Power MOSEFETs Conidering Thermal Aging Effects:, IEEE Trnasactions on Device and Materials Reliability, vol. 14, No. 1, Mar. 2014.

* cited by examiner

CABLE POWER RATING IDENTIFICATION FOR POWER DISTRIBUTION OVER COMMUNICATIONS CABLING

STATEMENT OF RELATED APPLICATION

The present application claims priority from U.S. Provisional Application No. 62/676,695, entitled CABLE DETECTION AND LOCKING MECHANISM FOR POWER DISTRIBUTION OVER COMMUNICATIONS CABLING, filed on May 25, 2018. The contents of this provisional application are incorporated herein by reference in its entirety.

TECHNICAL FIELD

The present disclosure relates generally to communication networks, and more particularly, to power distribution over communications cabling.

BACKGROUND

Power over Ethernet (PoE) is a technology for providing electrical power over a wired telecommunications network from power sourcing equipment (PSE) to a powered device (PD) over a link section. In conventional PoE systems that use power sources operating at 90 W or less, significant protection mechanisms are not needed because the limited power system classification does not cause destructive damage or life safety concerns. In newer systems that may exceed the 90 W threshold, it is important to define safety mechanisms that protect both the system and the user.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
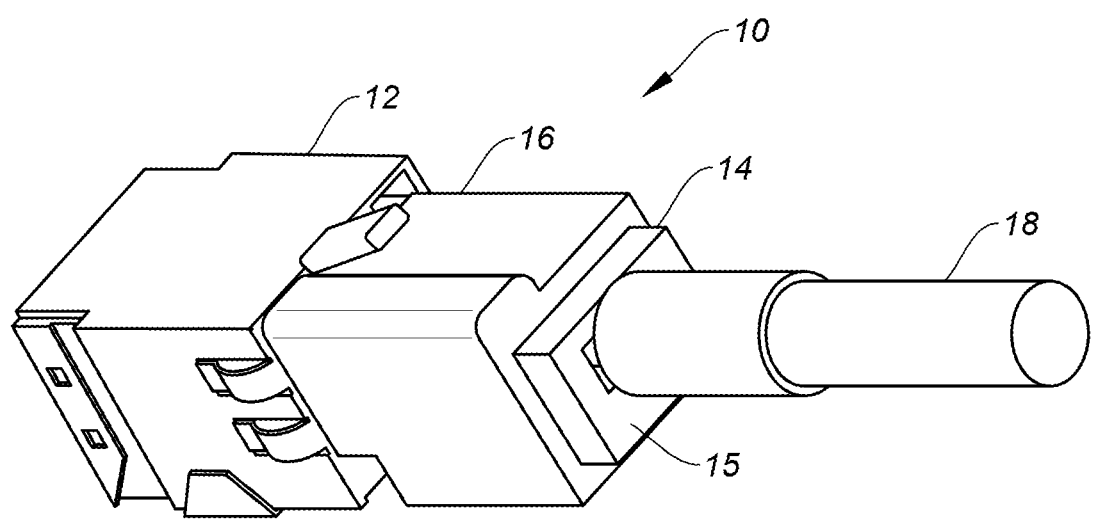
FIG. 1 is a perspective of a connector and cable system, in accordance with one embodiment.

In one embodiment, an apparatus generally comprises a cable identifier for attachment to a plug and cable assembly operable to deliver Power over Ethernet (PoE) at a power greater than 90 watts, the plug and cable assembly receivable in a receptacle delivering the PoE. The cable identifier is configured for mating with the receptacle and comprises an electrical identifier for use in identifying a power rating of the cable when the plug and cable assembly is inserted into the receptacle.

In another embodiment, a method generally comprises detecting a plug and cable assembly inserted into a receptacle at a network device, the plug and cable assembly comprising an electronic identifier indicating a power rating of the plug and cable assembly, sensing a value of the electronic identifier corresponding to the power rating of the cable, determining that the power rating of the cable meets a minimum specified value, and enabling power delivery to the plug and cable assembly at the receptacle.

In yet another embodiment, a network device generally comprises a plurality of receptacles for receiving plug and cable assemblies each configured to deliver Power over Ethernet (PoE) at a power level greater than 90 watts, and a controller for detecting a power rating for each of the plug and cable assemblies and enabling power delivery to the plug and cable assembly if the power rating meets a specified power rating. The plug and cable assembly comprises an electrical identifier for use in identifying the power rating when the plug and cable assembly is inserted into one of the receptacles.

Further understanding of the features and advantages of the embodiments described herein may be realized by reference to the remaining portions of the specification and the attached drawings.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

In conventional Power over Ethernet (PoE) systems used to simultaneously transmit power and data communications, power is delivered from power sourcing equipment (PSE) to a powered device (PD) over the same twisted pair cable used for data. The maximum power delivery capacity of standard PoE is approximately 90 watts (W), but many classes of powered devices would benefit from power delivery of 100 watts or greater (referred to as higher power PoE or ultra power).

Conventional PoE (e.g., 90 watts and less) is intended for safe operation over cable systems such as 22 to 26 AWG (American Wire Gauge) cable systems using common RJ45 connector systems. In newer systems that may exceed 100 W, new cable connector systems are needed. For example, for higher power systems, such as those using 150 W, 200 W, 250 W, or 300 W (or any other power level≥100 W) only dedicated cables and protected/hardened connectors should be used. Cable presence detection and cable type identification is therefore needed for PoE applications for higher power level systems (e.g., >90 W).

The embodiments described herein provide for the use of rated cable systems in applications using power higher than used in conventional managed PoE applications. One or more embodiments may be used to detect proper cable installation in higher power PoE applications (e.g., PoE operation with higher power than IEEE802.3bt standard power levels). In one or more embodiments, power delivery may be enabled or disabled based on compatibility of the cable power rating and power system to prevent possible damage or safety issues. One or more embodiments may also lock a cable plug (e.g., RJ45 or similar plug) into a receptacle to prevent inadvertent removal.

The embodiments may be implemented, for example, with connectors and cables designed for operation at power levels greater than 90 W (e.g., 100 W, 150 W, 300 W, 450 W (or other power level)) and cable lengths from 5 meters to about 50 meters (or other suitable lengths), as appropriate for a defined cable system. In one embodiment, a connector system comprises RJ45 cat7 style 4 pair communications cabling. The connector system interconnects ports and combines data and PoE. In one example, the cable and connector system supports ampacity per pin or wire to 2000 ma, minimum. For example, 22 AWG wire may be used to support 1500 ma-2000 ma per wire in a cat7/cat5e cable system. In one example, the system may support 15 meter cable length (based on technology of cat7 cable, 22 AWG at 300 W). Internal PSE power supply voltage may operate in the 56V to 57V range, 57V to 58V range, or 56V to 58V range, for example, or any other suitable range.

It is to be understood that the connectors, cables, cable lengths, cable and connector standards, and power, current, and voltage ranges described herein are only examples and that other types of connectors, plugs, jacks, cables, cable systems, cable lengths, power levels, or current ranges may be used without departing from the scope of the embodiments.

Referring now to the drawings and first to FIG. 1, a connector and cable system is shown in accordance with one embodiment. The connector 10 comprises a receptacle 12 and a plug 14 with a cable identifier 16 attached to the plug. The plug 14 is attached to a cable 18 and inserted into the receptacle 12. In the example shown in FIG. 1, the cable identifier 16 comprises a rectangular collar (ring) slidable onto the plug 14 and configured to mate (electronically couple) with the receptacle 12. The cable identifier 16 may also be attached to the plug 14 (e.g., mounted on one or more sides of the plug) or integrally formed therewith. In one or more embodiments, the cable identifier 16 may be backward compatible (and compliant) with a conventional standard RJ45 plug. In one or more embodiments, the cable identifier 16 may be compatible with standard RJ45 receptacles with modification to one of the light indicators, as described below.

The receptacle 12 is contained within a network device (as described below with respect to FIG. 9) for receiving the plug and cable assembly 15. The cable identifier 16 may also comprise a locking element (described below with respect to FIG. 4B) for retaining the plug 14 within the receptacle 12 to avoid improper removal of the plug and cable assembly 15 prior to disabling power.

As described in detail below, the cable identifier 16 may be used to provide an indication as to the power rating of the attached cable 18. In one or more embodiments, the cable identifier 16 comprises an electrical identifier (ID) (e.g., resistor, capacitor, or other electrical component) configured for electrical connection with electronics at the receptacle 12 to provide an electrical indication identifying the power rating of the cable. The electrical identifier may provide, for example, a resistance value that indicates a power rating of the cable 18 (e.g., cable is capable of operation at a power≤x watts (where different resistors indicate different values of x) or a general indication of higher power operation capability (e.g., resistor indicates cable is capable of operation at higher power)). The cable identifier 16 may also be color coded to visual indicate a power rating of the attached cable 18. Thus, cable identification may be determined based on the electronic identifier installed in the cable identifier 16, color coding of the cable identifier, or both electronic identifier and color coding.

In one or more embodiments, the cable identifier 16 and a power control system allow for enabling and disabling of power delivery through the connector and cable system 10 based on a cable power rating. For example, the power control system may enable the generation of a voltage for delivery of higher power PoE only when a cable with a compatible power rating is detected. Proper cable detection is based on the electronic identifier, which may comprise a resistor located in the cable identifier 16. In one example, if the resistor within the cable identifier 16 has a value less than an expected value for a specified PoE power rating, power is delivered to the cable. If the detected resistor has a value greater than the expected value for the specified power rating, power is disabled (removed or not delivered to the cable) through the connector 10. Power may also be immediately removed if the detected resistor value increases (e.g., plug and cable assembly 15 disconnected from the receptacle 12).

Figure 2:
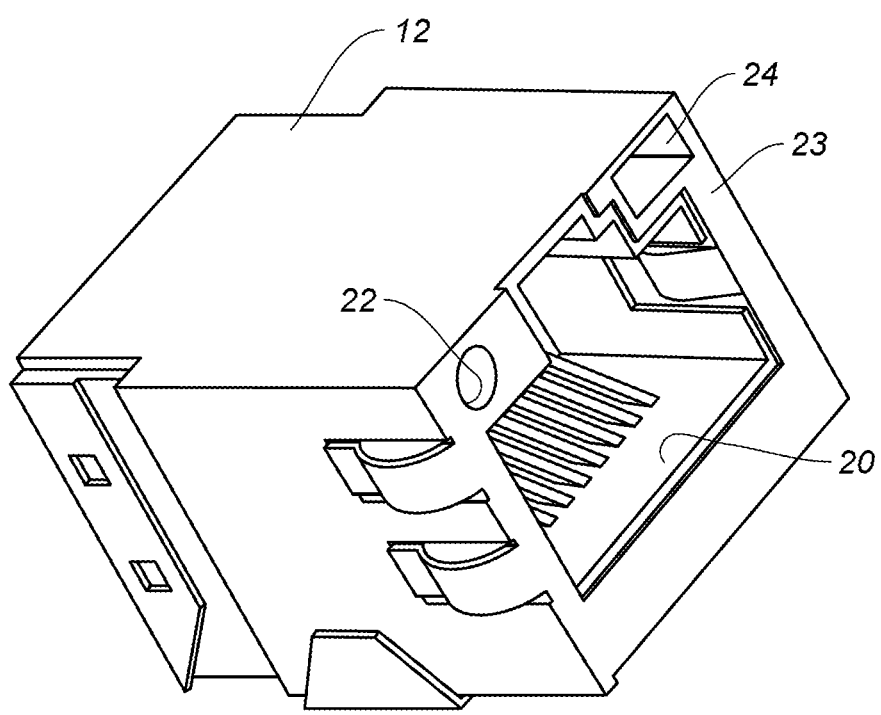
FIG. 2 is a perspective of a receptacle of the connector and cable system of FIG. 1.
Figure 5:
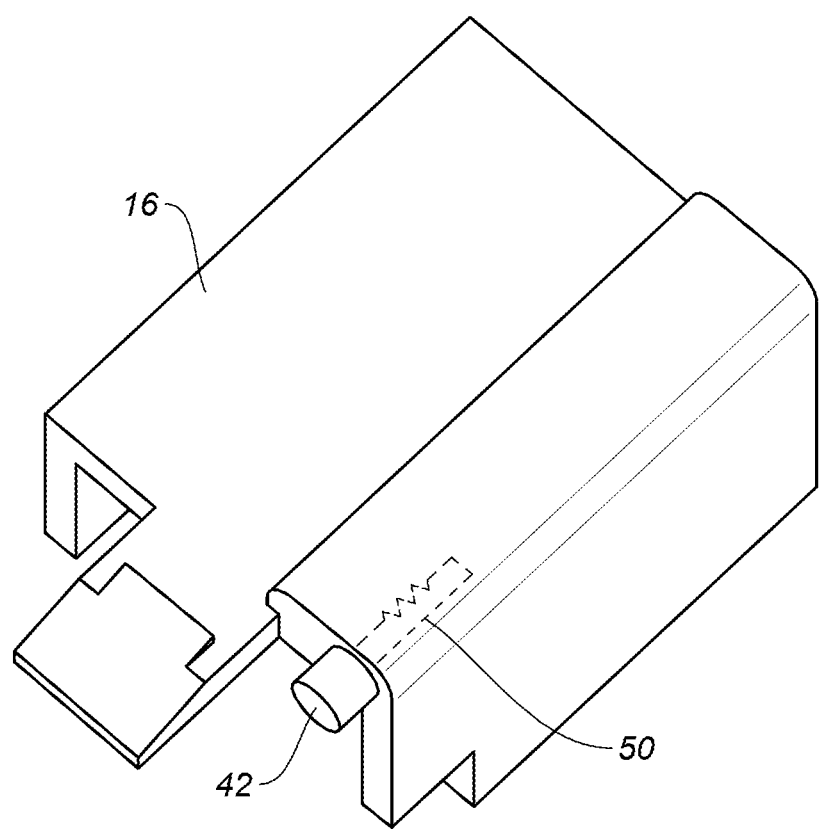
FIG. 5 is a perspective of a cable identifier of the connector and cable system of FIG. 1, with a location of an internal resistor shown.

FIG. 2 illustrates an example of the receptacle 12, in accordance with one embodiment. In one example, the receptacle 12 generally corresponds in size and shape to an RJ45 receptacle and comprises an opening 20 configured for receiving an RJ45 plug. The receptacle 12 is modified to include an opening 22 extending rearwardly from a front face 23 of the receptacle for receiving a plug 42 on the connector identifier 16 for connection to the electronic identifier (FIGS. 2 and 5).

In the example shown in FIG. 2, the opening 22 is located in a position where a link indicator (e.g., LINK LED (Light Emitting Diode)) is typically located on a standard RJ45 receptacle. In one or more embodiments, the function of the LINK LED is moved under the same light pipe of an ACTIVITY LED located at opening 24 on the opposite side of the receptacle face 23. In this example, the receptacle 12 retains one bi-color dual function LED at opening 24 on one side and comprises the opening 22 on the other side for receiving the plug 42 extending from the mating face of the cable identifier 16 (FIGS. 2 and 5). As described below with respect to FIG. 5, a resistor (with a suitable resistance value corresponding to a power rating of the cable 18) may be inserted between two poles of the plug 42 and can be detected internal to the receptacle 12 through two pins used in standard RJ45 receptacles for the LINK LED.

It is to be understood that the location of the opening 22 on the receptacle shown in FIG. 2, for receiving the cable identifier is only an example and other locations may be used including, for example, the location 24 of the indicator light on the other side of the receptacle face.

Figure 3:
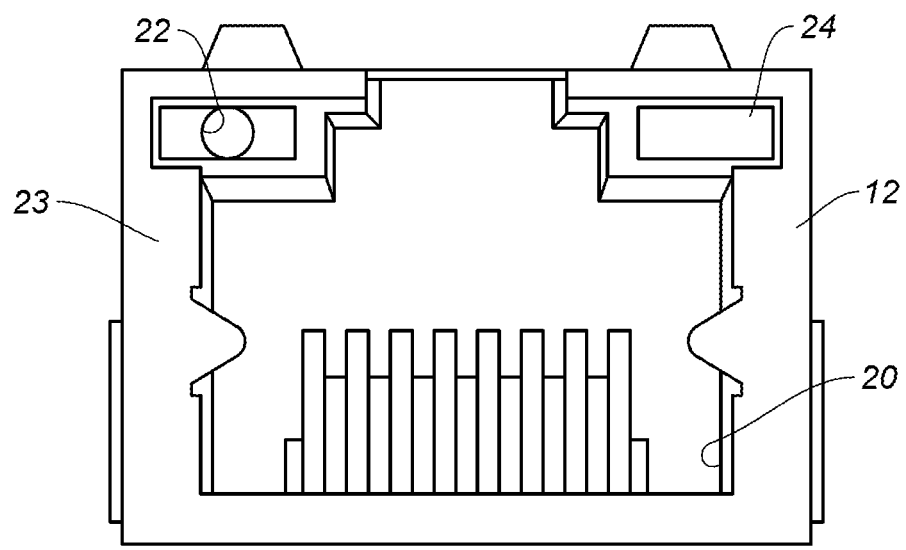
FIG. 3 is a front view of the receptacle.

FIG. 3 is a front view of the receptacle 12, in accordance with one embodiment. As described above with respect to FIGS. 1 and 2, the receptacle 12 includes opening 20 for receiving the plug 14, opening 22 for receiving the plug 42 of the cable identifier 16, and opening 24 for the LINK/ACTIVITY LED. The opening 22 may have a diameter of 2 mm, for example. It is to be understood that the receptacle 12 shown in FIG. 3 is only an example, and other suitable shapes and sizes may be used for the receptacle including those corresponding to standard RJ45 dimensions.

Figure 4A:
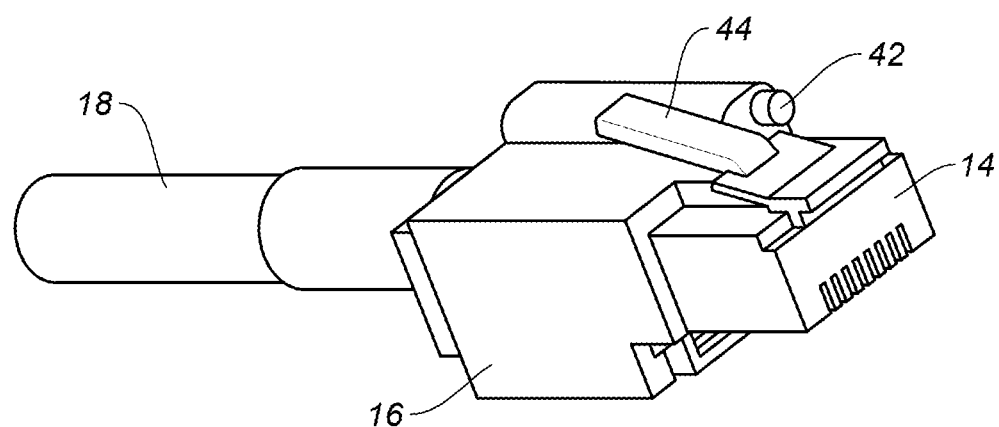
FIG. 4A is a top perspective of a plug and cable assembly of the connector and cable system of FIG. 1.
Figure 4B:
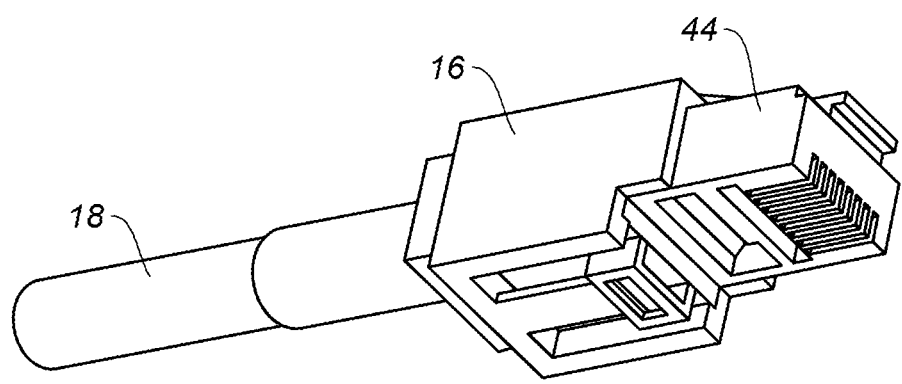
FIG. 4B is a bottom perspective of the plug and cable assembly of FIG. 4A.

FIGS. 4A and 4B illustrate an example of the plug and cable assembly removed from the receptacle 12. The plug 14 may be a standard RJ45 plug with a retaining clip 44. In the example shown in FIGS. 4A and 4B, the cable identifier 16 comprises a collar (tubular member) extending at least partially around the plug 14 and includes the plug 42 extending from a receptacle mating face of the cable identifier 16 for insertion into the opening 22 on the receptacle 12 (FIGS. 2 and 4A). As previously noted, the plug 42 comprises (or is in contact with) the electrical identifier (e.g., resistor or other electrical component) that provides an electrical indication of the power rating of the attached cable 18.

FIG. 4B is a bottom perspective of the plug and cable assembly and shows one example of a locking mechanism (member) 46 for use in locking the plug 14 inside the receptacle 12 to prevent inadvertent removal of the plug and cable assembly before removing power from the port and avoid accidental plug disconnection. The locking mechanism 46 may be used to lock in place the standard plastic clip 44 (FIGS. 4A and 4B). In order to remove the plug 14 from the receptacle, a user may need to use a tool or finger to press in the locking member 46 and release the plug 14.

FIG. 5 illustrates an internal location of the electrical identifier on the cable identifier 16. As shown in FIG. 5, the electrical identifier may comprise a resistor 50 positioned for engagement with an electrical circuit at the receptacle by the cable identifier 16. The electrical identifier (e.g., resistor) 50 may include two contacts for mating with corresponding electrical contacts on the receptacle 12. The resistor 50 may be soldered to the two contacts and added inside the cable identifier adjacent to the plug 42, as indicated in FIG. 5, for example.

Figure 6A:
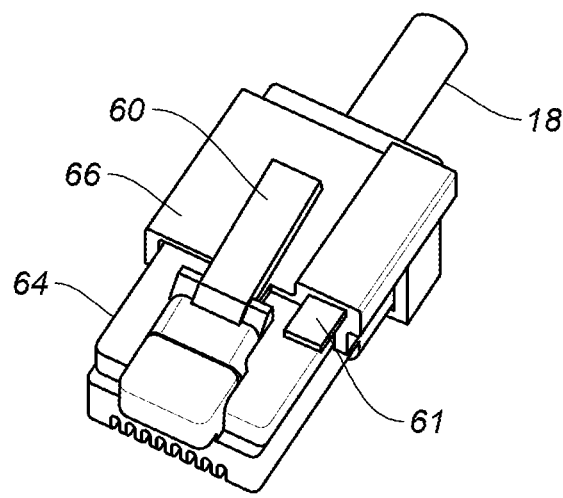
FIG. 6A is a perspective of another example of a plug and cable assembly.
Figure 6B:
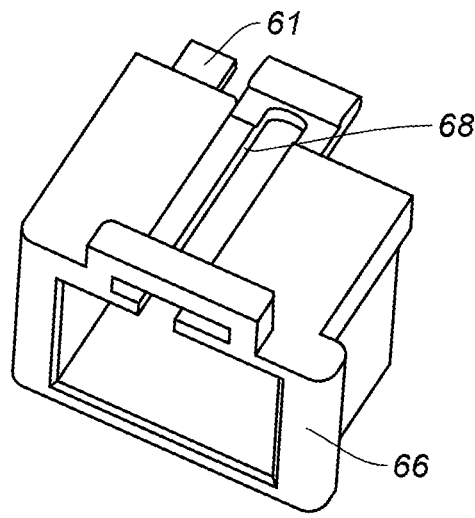
FIG. 6B is a perspective of a cable identifier of the plug and cable assembly shown in FIG. 6A.
Figure 6C:
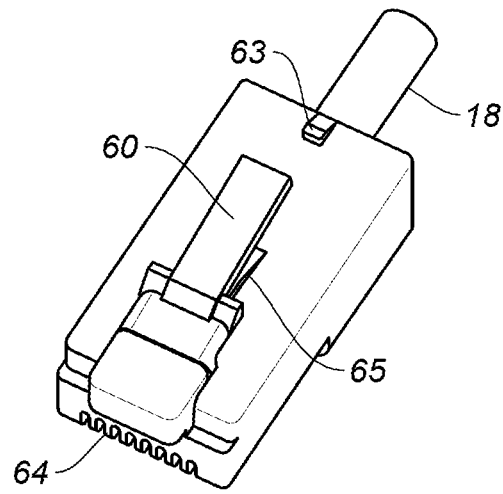
FIG. 6C is a perspective of a plug and cable with the cable identifier removed.

FIGS. 6A, 6B, and 6C illustrate another example of a connector and cable system. FIG. 6A shows a plug 64 attached to cable 18, inserted into a rectangular cable identifier 66. In this example, the cable identifier 66 includes a slot 68 (FIG. 6B) for receiving tabs 63, 65 protruding from an upper surface of the plug 64 rearward of clip 60 (FIG. 6C). In this example, the electrical identifier is connected to a generally flat plug 61 for insertion into a corresponding opening in the receptacle.

Figure 7:
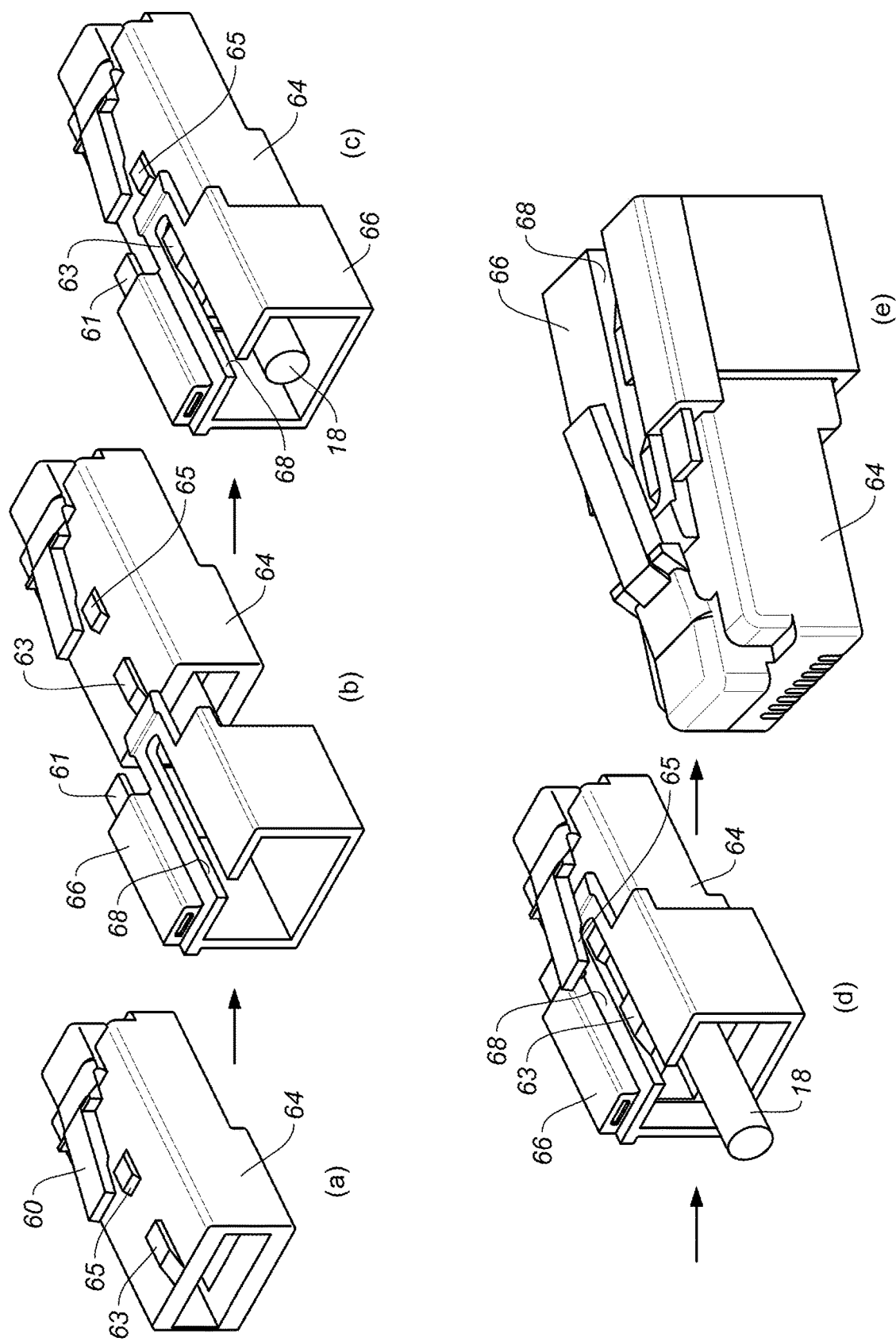
FIG. 7 illustrates assembly of the plug and cable identifier shown in FIGS. 6B and 6C.

FIG. 7 illustrates assembly of the plug 64 and cable identifier 66. Step (a) provides the plug 64 comprising the retaining clip 60 and locking tabs 63, 65. Step (b) shows the cable identifier 66 positioned for receiving the plug 64 in a central opening. Step (c) shows the cable identifier 66 slid partially over the plug 64 and cable 18 with the first tab 63 inserted into the slot 68 on the cable identifier. At step (d) the cable identifier 66 is moved forward onto the plug 64 and latched into place with the second tab 65 inserted into the slot 68. Once latched as shown in steps (d) and (e), the cable identifier 66 may be removed from the plug 64 by grasping the sides of the cable identifier (block) and moving the block rearward over the tabs 63, 65. A rib (not shown) may be added to one or both sides of the cable identifier 66 for use in removing the cable identifier 66 from the plug 64.

It is to be understood that the shape of the cable identifier 16, 66 shown and described herein is only an example and that other configurations may be used without departing from the scope of the embodiments. For example, any suitable cable identifier element comprising the electrical identifier may be attached to the plug 14 with electrical identifier contacts properly positioned to mate with corresponding contacts in the receptacle 12. As previously noted, the cable identifier (electrical identifier and mating interface) may also be integrally formed with the plug 14. For example, a resistor may be inserted into the plug body and a suitable interface for mating with the receptacle electronics formed on the plug.

Figure 8A:
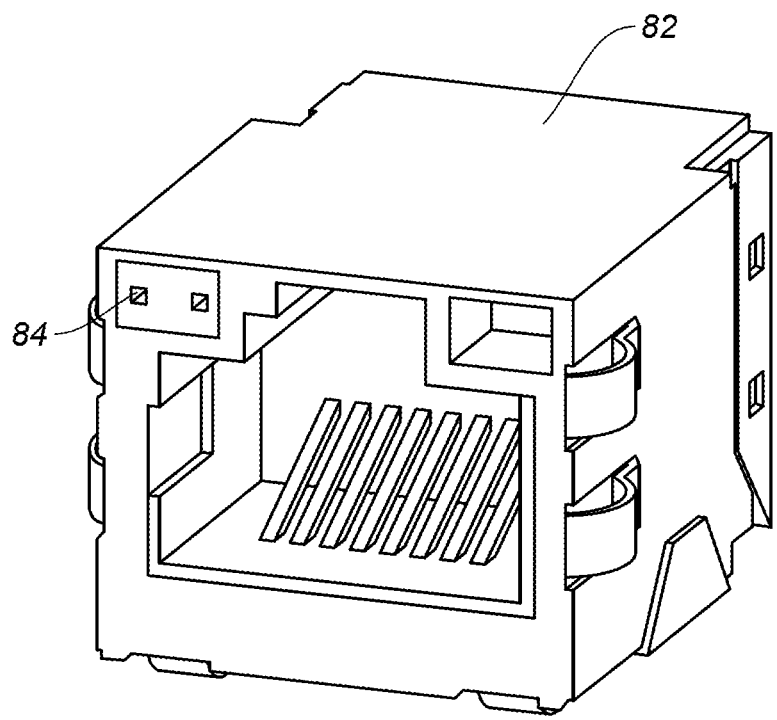
FIG. 8A is a perspective of a receptacle configured for use with a cable identifier having a dual pin configuration.
Figure 8B:
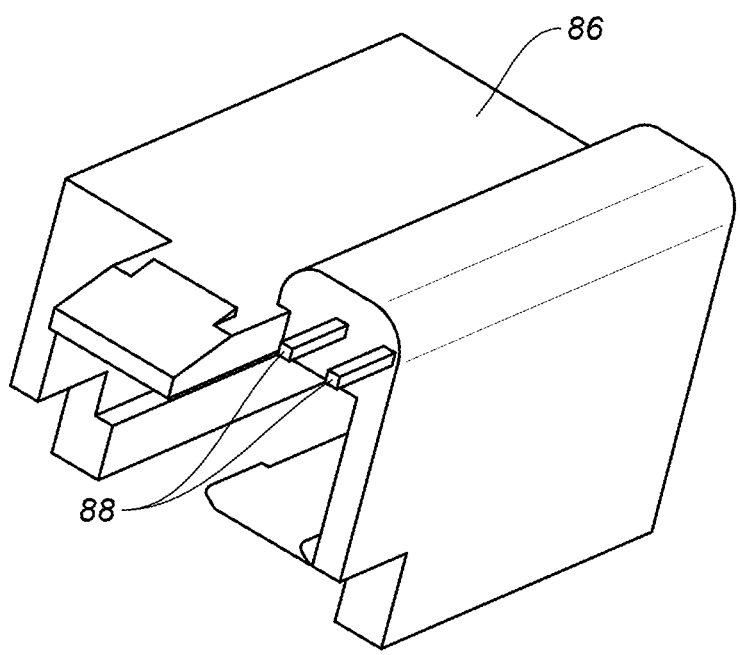
FIG. 8B is a perspective of the cable identifier with the dual pin configuration for use with the receptacle shown in FIG. 8A.

Also, the plug extending from a face of the cable identifier for insertion into the receptacle may comprise a cylindrical plug 42 (FIG. 5), a flat plug 61 (FIG. 6B), or any other shape element configured for being received in an opening on a face of the receptacle 12. In the example shown in FIGS. 8A and 8B, a receptacle 82 comprises a pair of openings 84 for receiving dual pins (plug) 88 extending outward from a face of a cable identifier 86. The cable identifier plug and receptacle opening may also be switched, with the male portion on the receptacle and female portion on the cable identifier. The interface may also comprise aligned planar electrical contact surfaces or any other type of mating electrical contacts.

The embodiments described herein operate in the context of a data communications network including multiple network devices. The network may include any number of network devices in communication via any number of nodes (e.g., routers, switches, gateways, controllers, access points, or other network devices), which facilitate passage of data within the network. The network devices may communicate over or be in communication with one or more networks (e.g., local area network (LAN), metropolitan area network (MAN), wide area network (WAN), virtual private network (VPN) (e.g., Ethernet virtual private network (EVPN), layer 2 virtual private network (L2VPN)), virtual local area network (VLAN), wireless network, enterprise network, corporate network, data center, Internet of Things (IoT), Internet, intranet, or any other network).

The network is configured to pass electrical power along with optical data to provide both data connectivity and electric power to network devices such as switches, routers, access points, or other electronic components and devices. Signals may be exchanged among communications equipment and power transmitted from power sourcing equipment to powered devices. The network may include any number or arrangement of network communications devices (e.g., switches, access points, routers, or other devices operable to route (switch, forward) data communications). One or more of the network devices may deliver power using PoE to electronic components such as other network devices, equipment, appliances, or other electronic devices.

Figure 9:
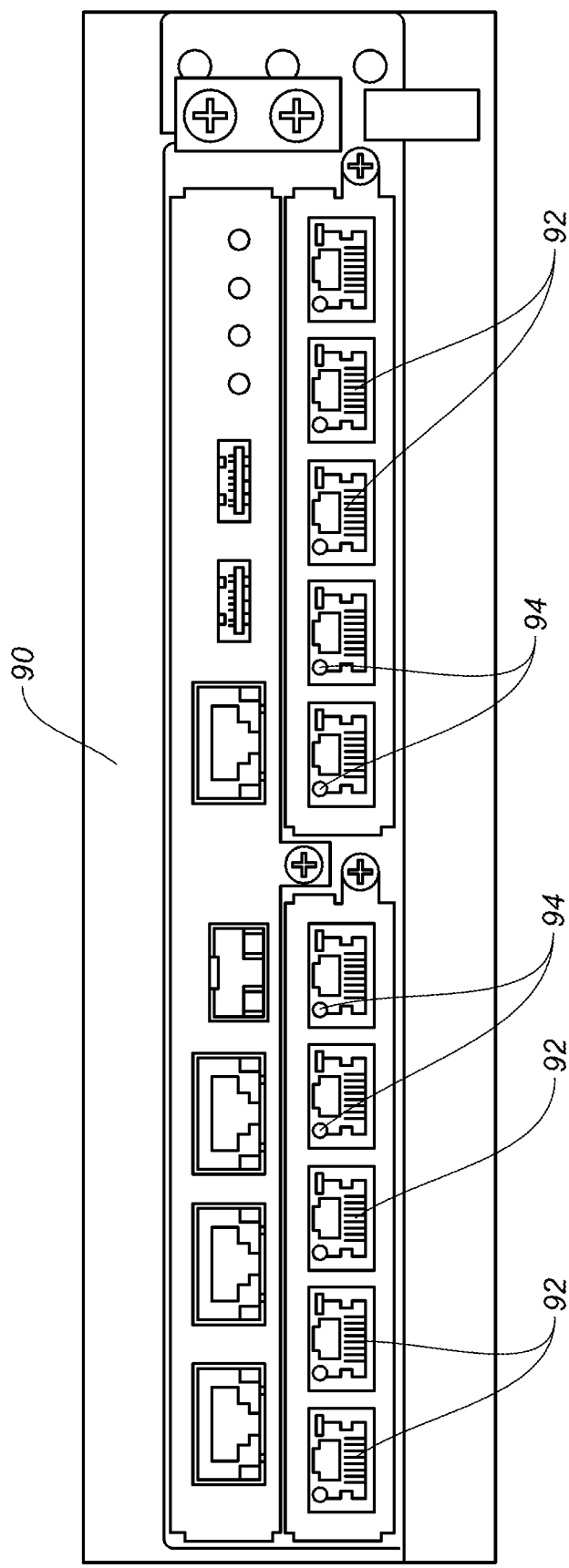
FIG. 9 is a front view of an example of a network device comprising a plurality of receptacles of the connector and cable system shown in FIG. 1.

FIG. 9 illustrates an example of a network device 90 comprising a plurality of ports comprising receptacles 92 of a connector and cable system described herein for delivery of higher power PoE. One or more of the receptacles 92 may comprise openings 94 for receiving a plug of the cable identifier as previously described. The network device 90 may be configured to delivery higher power PoE (e.g., >90 W) to any number of ports.

The network device 90 further comprises a power controller (described below with respect to FIGS. 10 and 11) operable to identify a power rating of a cable coupled to the receptacle and deliver power based on the power rating. For example, the power controller may detect if a cable is rated for operation at a power level above 90 W. If the cable is rated for higher power operation, power will be enabled on the port, otherwise power will be disabled. In another example, if the cable is not rated for higher power operation, power may be delivered but only at levels at or below 90 W. As previously noted, the electrical identifier may also identify a specific power level rating for the cable. For example, different resistors may be used based on the power rating of the cable (e.g., 100 W, 200 W, 300 W). Power may then be delivered at a power level corresponding to the specific power rating of the cable.

Figure 10:
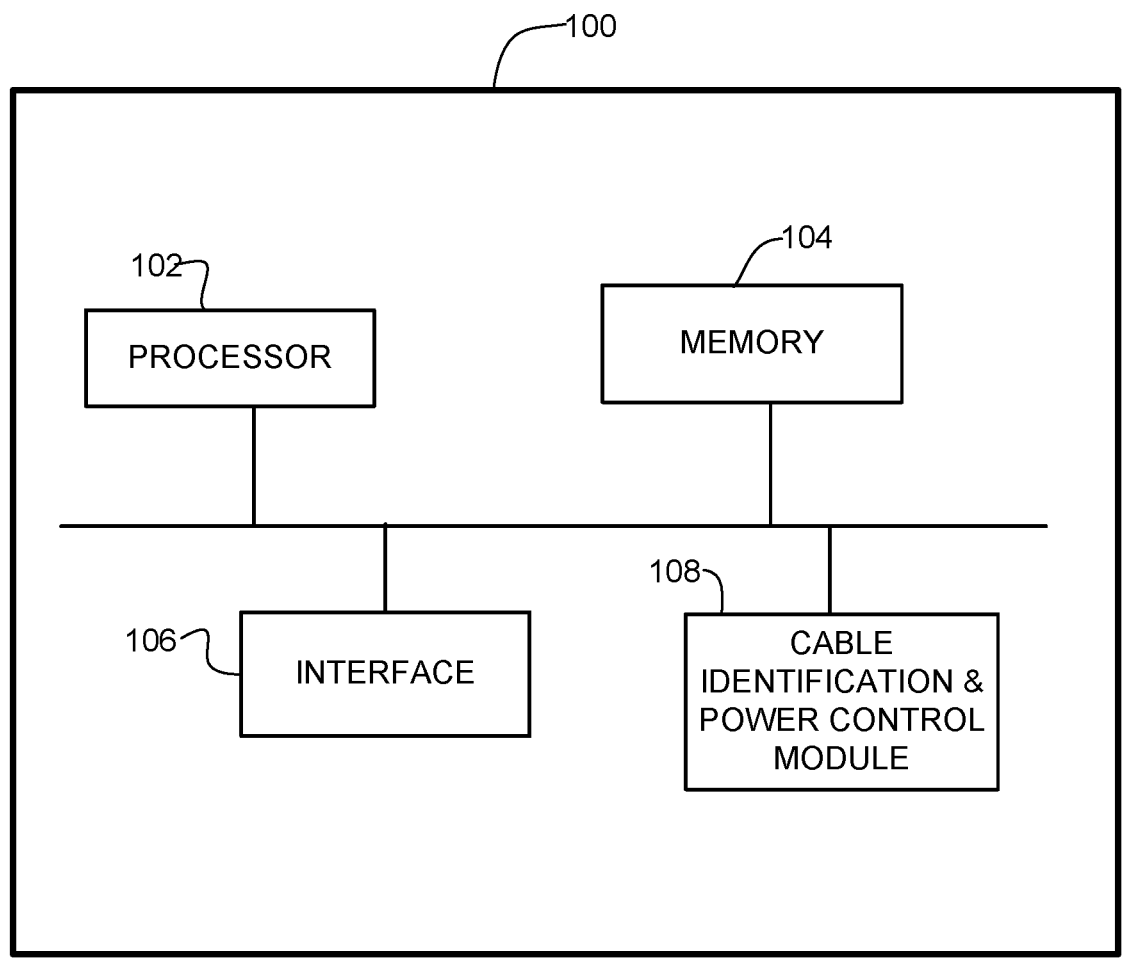
FIG. 10 is a block diagram depicting an example of a network device useful in implementing embodiments described herein.

FIG. 10 is a block diagram of one example of a network device 100 that may be used to implement the embodiments described herein. In one embodiment, the network device 100 is a programmable machine that may be implemented in hardware, software, or any combination thereof. The network device 100 includes one or more processors 102, memory 104, interface 106, and cable identification and power control module 108.

Memory 104 may be a volatile memory or non-volatile storage, which stores various applications, operating systems, modules, and data for execution and use by the processor 102. For example, components of the cable identification and power control module 108 (e.g., code, logic, or firmware, etc.) may be stored in the memory 104. The network device 100 may include any number of memory components.

The network device 100 may include any number of processors 102 (e.g., single or multi-processor computing device or system), which may communicate with a forwarding engine or packet forwarder operable to process a packet or packet header. The processor 102 may receive instructions from a software application or module, which causes the processor to perform functions of one or more embodiments described herein.

Logic may be encoded in one or more tangible media for execution by the processor 102. For example, the processor 102 may execute codes stored in a computer-readable medium such as memory 104. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. Logic may be used to perform one or more functions described below with respect to the flowchart of FIG. 11.

The interface 106 may comprise any number of interfaces or network interfaces (line cards, ports, connectors, receptacles) for receiving data or power, or transmitting data or power to other devices. The network interface may be configured to transmit or receive data using a variety of different communications protocols and may include mechanical, electrical, and signaling circuitry for communicating data over physical links coupled to the network or wireless interfaces. For example, line cards may include port processors and port processor controllers. The interface 106 may be configured for PoE, higher power PoE, enhanced PoE, PoE+, UPoE, or similar operation.

In one or more embodiments, the cable identification and power control module 108 may be operable to verify cable application and cable removal as described in U.S. patent application Ser. No. 16/020,917, entitled "Verification of Cable Application and Reduced Load Cable Removal in Power Over Communications Systems", filed Jun. 27, 2018, which is incorporated herein by reference in its entirety.

It is to be understood that the network device 90, 100 shown in FIGS. 9 and 10 and described above is only an example and that different configurations of network devices may be used. For example, the network device may further include any suitable combination of hardware, software, algorithms, processors, devices, components, or elements operable to facilitate the capabilities described herein.

Figure 11:
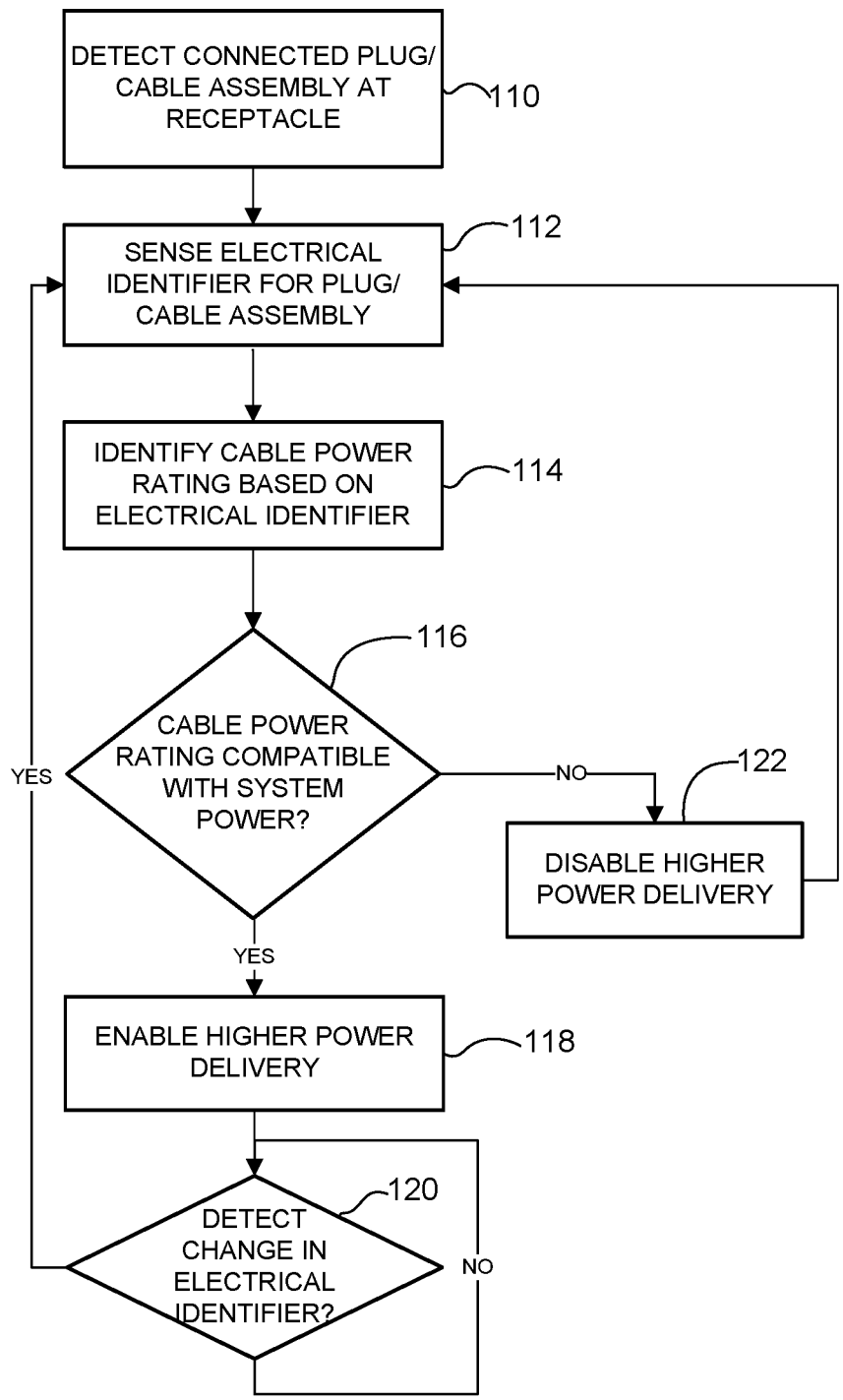
FIG. 11 is a flowchart illustrating an overview of a process for identifying a power rating of a cable based on the cable identifier and controlling power delivery, in accordance with one embodiment.

FIG. 11 is a flowchart illustrating an overview of a process for identifying a cable power rating and controlling power delivery based on compatibility of the cable and a higher power PoE system. At step 110, the system detects a connected plug and cable assembly 15 with the cable identifier/electrical identifier at the receptacle 12 (FIGS. 1 and 11). As shown in FIG. 1, the plug and cable assembly (e.g., a portion of the plug 14) is received in the receptacle 12. The system senses the electrical identifier (e.g., resistor value) located in the cable identifier 16 attached to the plug 14 (step 112). The system may apply a low voltage (e.g., ≤90 W) to the connector and cable system to sense the resistor value. The power control module identifies the power rating of the cable based on the electrical identifier (e.g., resistor value) (step 114). If the electrical identifier indicates that the cable power rating is compatible with the power level of the higher power system (step 116), power delivery (i.e., higher power PoE) is enabled on the connector and cable system (step 118). For example, if the cable power rating corresponds to a specified power rating (e.g., ≥minimum power rating) power will be enabled at a high power level (e.g., >90 W). If the identified cable power rating is not compatible with the power system, higher power is disabled (e.g., not applied) (steps 116 and 122). In this case, a lower power (e.g., ≤90 W) may be delivered or all power may be turned off to the port. The system may enable higher power delivery if a cable power rating compatible with higher power is detected. If a change in the electrical identifier is detected (step 120) (e.g., plug and cable assembly 15 removed or a new plug and cable assembly inserted), the process is repeated (steps 112, 114, 116, and 118 or 122).

Although the method and apparatus have been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. An apparatus comprising:
   a cable identifier for attachment to a plug and cable assembly operable to deliver Power over Ethernet (PoE) at a power greater than 90 watts, the plug and cable assembly receivable in a receptacle delivering said PoE;
   wherein the cable identifier is configured for mating with the receptacle and comprises an electrical identifier comprising an electrical interface for use in identifying a power rating of the cable when the plug and cable assembly is inserted into the receptacle.

2. The apparatus of claim 1 wherein the cable identifier comprises a locking member for retaining the plug and cable assembly within the receptacle.

3. The apparatus of claim 1 wherein the electrical identifier comprises a resistor comprising a resistance value corresponding to a power rating of the plug and cable assembly.

4. The apparatus of claim 1 wherein the cable identifier comprises a plug receivable in an opening in a face of the receptacle, the plug comprising electrical contacts for mating with electrical contacts within the receptacle.

5. The apparatus of claim 4 wherein the receptacle comprises an indicator light on an opposite side of a location of said opening on said face of the receptacle.

6. The apparatus of claim 1 wherein the cable identifier is color coded to indicate a power rating of the cable.

7. The apparatus of claim 1 wherein a plug of the plug and cable assembly comprises an RJ45 plug and the receptacle corresponds in shape to an RJ45 receptacle.

8. The apparatus of claim 1 wherein the cable identifier comprises a collar slidable onto the plug.

9. The apparatus of claim 1 wherein the electrical identifier comprises a circuit with contacts receivable in an opening in the receptacle.

10. A method comprising:
    detecting a plug and cable assembly inserted into a receptacle at a network device, the plug and cable assembly comprising an electrical identifier indicating a power rating of the plug and cable assembly;
    sensing a value of the electrical identifier corresponding to said power rating of the cable;
    determining that said power rating of the cable meets a minimum specified value; and
    enabling power delivery to the plug and cable assembly at the receptacle;
    wherein sensing said value comprises sensing a resistance value and further comprising detecting a change in said resistance value and disabling power delivery to the plug and cable assembly.

11. The method of claim 10 wherein the plug and cable assembly are retained within the receptacle with a locking member.

12. The method of claim 10 wherein the electrical identifier comprises a resistor comprising a resistance value corresponding to said power rating of the cable.

13. The method of claim 10 wherein enabling said power delivery comprises enabling said power delivery at a power level greater than 90 watts.

14. The method of claim 10 wherein enabling said power delivery comprises enabling said power delivery at a power level compatible with said power rating of the cable.

15. The method of claim 10 further comprising disabling power delivery or limiting power delivery to a power level less than or equal to 90 watts if said power rating does not meet said specified power rating.

16. The method of claim 10 wherein the electrical identifier comprises a circuit with contacts receivable in an opening in the receptacle.

17. A network device comprising:
    a plurality of receptacles for receiving plug and cable assemblies each configured to deliver Power over Ethernet (PoE) at a power level greater than 90 watts; and
    a controller for detecting a power rating for each of the plug and cable assemblies and enabling power delivery to the plug and cable assembly if said power rating meets a specified power rating, the controller operable to deliver power at a power level less than or equal to 90 watts if said power rating does not meet said specified power rating;
    wherein the plug and cable assembly comprises an electrical identifier for use in identifying said power rating when the plug and cable assembly is inserted into one of the receptacles.

18. The network device of claim 17 wherein the controller is operable to disable power delivery if said power rating does not meet said specified power rating.

19. The network device of claim 17 wherein the electrical identifier comprises a resistor comprising a resistance value corresponding to said power rating.

20. The network device of claim 19 wherein the controller is operable to detect a change in said resistance value and disable power delivery to the plug and cable assembly.

* * * * *